(12) United States Patent
Cheng

(10) Patent No.: US 12,544,724 B2
(45) Date of Patent: Feb. 10, 2026

(54) GRINDING LIQUID MIXING AND SUPPLYING SYSTEM

(71) Applicant: Creative System Technology Ltd., Hsinchu (TW)

(72) Inventor: Huo Lung Cheng, Hsinchu (TW)

(73) Assignee: Creative System Technology Ltd., Hsinchu (TW)

( * ) Notice: Subject to any disclaimer, the term of this patent is extended or adjusted under 35 U.S.C. 154(b) by 450 days.

(21) Appl. No.: 18/144,863

(22) Filed: May 9, 2023

(65) Prior Publication Data
US 2023/0405534 A1  Dec. 21, 2023

(30) Foreign Application Priority Data
May 19, 2022 (TW) ................................. 111118734

(51) Int. Cl.
*B01F 23/50* (2022.01)
*B01F 33/45* (2022.01)
*B01F 35/00* (2022.01)
*B01F 35/21* (2022.01)
*B01F 35/221* (2022.01)
*B24B 57/02* (2006.01)

(52) U.S. Cl.
CPC .............. *B01F 23/59* (2022.01); *B01F 33/45* (2022.01); *B01F 35/187* (2022.01); *B01F 35/2112* (2022.01); *B01F 35/2212* (2022.01); *B24B 57/02* (2013.01)

(58) Field of Classification Search
CPC ............. F16H 57/0404; F16H 57/0441; F16H 57/0405; B25J 17/02; B25J 19/0062; B25J 17/00; B01D 35/02; B01F 23/59; B01F 33/45; B01F 35/187; B01F 35/2112; B01F 27/808; B01F 35/53; B01F 35/221; B01F 35/2212; B24B 57/02; B24B 37/04
USPC ..................... 366/136–137, 153.1, 273–274
See application file for complete search history.

(56) References Cited

U.S. PATENT DOCUMENTS

| | | | | |
|---|---|---|---|---|
| 3,807,701 A | * | 4/1974 | Reid et al. | B01J 19/0006 366/132 |
| 3,830,473 A | * | 8/1974 | Lieferman | C08B 30/16 366/136 |
| 3,948,490 A | * | 4/1976 | Troope | D06M 11/60 366/348 |

(Continued)

FOREIGN PATENT DOCUMENTS

| | | | |
|---|---|---|---|
| CN | 1356369 A | * | 7/2002 |
| WO | WO-9308905 A1 | * | 5/1993 |

*Primary Examiner* — Charles Cooley

(57) ABSTRACT

A grinding liquid mixing and supplying system comprises a stock solution barrel, a stock solution circulation tank, a grinding liquid mixing tank, a grinding liquid supplying tank, which are configured with pipelines that interconnect each other; and capacitive liquid level sensors connected in parallel with these tanks. The stock solution circulation tank is provided with a first pipeline, the first pipeline is provided with a first filter and a first pump, and the first pipeline allows the stock solution to flow out from the stock solution circulation tank, to be pressurized by the first pump, to be sent to the first filter, and to flow back, so as to be circulated and filtered. The capacitive liquid level sensor detects a liquid level and monitors whether the liquid is normal in the tanks, so as to maintain and ensure the output quality of the grinding liquid.

11 Claims, 7 Drawing Sheets

(56) References Cited

U.S. PATENT DOCUMENTS

| | | | | |
|---|---|---|---|---|
| 6,132,078 | A * | 10/2000 | Lin | B24B 37/04 |
| | | | | 366/144 |
| 6,146,008 | A * | 11/2000 | Laederich | G05D 21/02 |
| | | | | 366/136 |
| 6,322,694 | B1 * | 11/2001 | Iliadis | B01D 17/10 |
| | | | | 210/167.01 |
| 2001/0002361 | A1 * | 5/2001 | Kawashima | B01F 23/49 |
| | | | | 451/443 |
| 2002/0136087 | A1 * | 9/2002 | Nakagawa | B01F 23/49 |
| | | | | 366/153.1 |
| 2002/0186613 | A1 * | 12/2002 | Hiraoka | B01F 23/49 |
| | | | | 366/136 |
| 2003/0095472 | A1 * | 5/2003 | Fukui | B01F 35/2132 |
| | | | | 366/153.1 |
| 2003/0100247 | A1 * | 5/2003 | Kim | B01F 23/59 |
| 2004/0151062 | A1 * | 8/2004 | Yao | B01F 35/88 |
| | | | | 366/137 |
| 2005/0099883 | A1 * | 5/2005 | Choi | B01F 35/88 |
| | | | | 366/152.2 |
| 2013/0019954 | A1 * | 1/2013 | Tseng | G01F 11/28 |
| | | | | 137/1 |
| 2023/0405534 | A1 * | 12/2023 | Cheng | B01F 35/187 |
| 2024/0239060 | A1 * | 7/2024 | Cheng | B29C 66/8145 |

* cited by examiner

GRINDING LIQUID MIXING AND SUPPLYING SYSTEM

CROSS-REFERENCE TO RELATED APPLICATION

This application claims priority of Taiwan application No. 111118734, filed on May 19, 2022, the content of which is incorporated herein in its entirety by reference.

BACKGROUND OF THE INVENTION

1. Field of the Invention

The present invention relates to the technical field of a grinding liquid supplying system, particularly, to a liquid supplying system utilizing multiple mechanisms to maintain the quality of the grinding liquid.

2. The Prior Arts

Chemical mechanical polishing or grinding (that is, chemical mechanical planarization (CMP)) in the semiconductor manufacturing process means that, during grinding, chemical removal forces and mechanical removal forces are combined to remove excess substances on the surface of the wafer for comprehensive planarization of the wafer surface. Chemical mechanical grinding basically uses a polishing device. A concentrated stock solution of grinding liquid is added and mixed with a certain amount of deionized water and chemical solvents, then transported to the polishing device. The grinding liquid is continuously injected, and a grinding pad is rotated and pressed on the wafer, so as to achieve the purpose of performing polishing/planarization of the wafer surface. The key consumables that affect the grinding quality are the grinding liquid and the grinding pad.

Presently, the preparation operation of the grinding liquid is generally through two procedures. The supplier provides the concentrated stock solution barrel. The stock solution is transported to the grinding liquid mixing tank, where multiple pipelines are connected to add deionized water and chemical solvent (such as $H_2O_2$) and mixing is performed. Then, the grinding liquid is transported to the grinding liquid supplying tank for standby, and finally transported to the polishing device of each machine through the connected diverting valve box. The grinding liquid is a slurry, and the slurry particles must be prevented from combining with each other during the mixing process. The purpose is to make the particles of the output grinding liquid fine and uniform, so that the wafer grinding quality is optimal. However, the concentrated stock solution barrel supplied by the manufacturer sometimes still contains fine impurities. Also, the shear stress generated during the mixing process can easily make the particles close together and combine, making the particle size exceed a preset size. Although some manufacturers install a filter in the pipeline prior to the diverting valve box, sometimes due to the excessive amount of condensed particles, in the process of high-pressure transportation, a grinding fluid with small amount of large particles will still be sent out, and scratches will be generated on the surface of the wafer during grinding. Under the current conditions of nano-level processing accuracy in semiconductors, the impact is very large, and it is a problem that must be solved at present. In addition, in the preparation process of the grinding liquid, from the original concentrated stock solution, the grinding liquid in the process of mixing, to the final preparation of the grinding liquid for use, in addition to the deionized water and chemical solvents added in the process, how to effectively monitor each liquid quality, so that once a problem occurs, deal with it immediately, so as to avoid a lot of time and money wasted in the past when the problem is found at the final output end. Because if the problem is found at the final output end, all the grinding fluid must be poured out, the problem must be found and overcome, and then the grinding fluid is re-prepared. Consequently, the previous raw material cost and adjustment time are wasted.

SUMMARY OF THE INVENTION

A primary objective of the present invention is to provide a grinding liquid mixing and supplying system, using a plurality of filtering mechanisms and a special mixing and stirring method, to reduce shear stress and condensation into coarse particles. Also, the liquid in the tank at each stage is monitored to ensure the liquid state at each stage. Therefore, with multiple safety mechanisms, the output grinding liquid is of high quality and state.

In order to achieve the foregoing object, the present invention adopts the following technical solutions:

The present invention is to provide a grinding liquid mixing and supplying system, comprising: a stock solution barrel outputting a stock solution from a stock solution pipeline; a stock solution circulation tank receiving the stock solution transferred by the stock solution pipeline, the stock solution circulation tank being provided with a first pipeline, the first pipeline being provided with a first filter and a first pump, and the first pipeline allowing the stock solution to flow out from the stock solution circulation tank, to be pressurized by the first pump, to be sent to the first filter, and to flow back, so as to be circulated and filtered; a grinding liquid mixing tank receiving the stock solution transferred by the first pipeline and preparing a required grinding liquid, the grinding liquid mixing tank is provided with a second pipeline and a maglev stirrer, the second pipeline being provided with a second filter and a second pump, the second pipeline allowing the grinding liquid to flow out from the grinding liquid mixing tank, to be pressurized by the second pump, to be sent to the second filter, and to flow back, so as to be circulated and filtered, and the maglev stirrer being configured at a bottom of the grinding liquid mixing tank with an inclination angle of 15-25 degrees; a grinding liquid supplying tank receiving the grinding liquid transferred by the second pipeline, the grinding liquid supplying tank being provided with an output pipeline, the output pipeline being provided with at least one output pump and a diverting valve box, the output pipeline allowing the grinding liquid to flow out from the grinding liquid supplying tank, to be pressurized by the output pump, to be sent to the diverting valve box, and to be output in a diverting manner; and a plurality of capacitive liquid level sensors, the stock solution circulation tank, the grinding liquid mixing tank, and the grinding liquid supplying tank being all connected in parallel with one capacitive liquid level sensor, and the capacitive liquid level sensor detecting a liquid level of a liquid and monitor whether the liquid is normal in the tanks.

As a preferred embodiment, the grinding liquid mixing tank is also connected to a grinding liquid measuring tank, a deionized water measuring tank, and a chemical product measuring tank, so as to prepare the required grinding liquid, the first pipeline is connected to the grinding liquid measuring tank, and the grinding liquid measuring tank, the deionized water measuring tank, and the chemical product measuring tank are all connected in parallel with one of the capacitive liquid level sensors.

As a preferred embodiment, the capacitive liquid level sensor includes a tube body, two conductive sheets, a clip, and a bundle tube, the tube body is vertically connected in parallel with the tank that it is connected to, the tank is at least one of the deionized water measuring tank and the chemical product measuring tank, so that a liquid level in the tube body is the same as the liquid level in the tank, and the two conductive sheets are arranged on an outer wall of the tube body in a manner that is fitting parallel to a center line of the tube body, the clip fixes the conductive sheets onto the outer wall of the tube body, the bundle tube is a metal tube and is sleeved onto an exterior of the tube body and the clip, and after the conductive sheets are conducted with electricity, a corresponding measured capacitance is generated based on a height difference of the liquid level in the tube body. This provides an innovative liquid level and liquid monitoring mechanism.

As a preferred embodiment, a relationship table between a volume and a capacitance of the liquid is prepared in advance for the capacitive liquid level sensor, and based on the conversion formula between the measured capacitance and the relationship table between the volume and the capacitance of the liquid, a relative liquid level is calculated through computer software.

As a preferred embodiment, a flow meter is configured in the pipelines supplying the liquid of the tanks, and the flow meter is used to obtain a supplied liquid volume injected into the tank, and a relationship table between a volume and a capacitance of the liquid is prepared in advance for the capacitive liquid level sensor, and based on the conversion formula between the measured capacitance and the relationship table between the volume and the capacitance of the liquid, a relative injected liquid volume is calculated through computer software, and compare whether the calculated liquid volume is the same as the supplied liquid volume, if the two are the same, it means that the liquid is normal, if not, it means that the liquid in the tank is not a preset liquid, and an abnormal state is reported.

As a preferred embodiment, two pressure detectors are respectively configured at the inlet and outlet pipelines positions of the first filter, and when a pressure difference between the two pressure detectors exceeds a preset value, a filter replacement operation is performed.

As a preferred embodiment, two pressure detectors are respectively configured at the inlet and outlet pipelines positions of the second filter, and when a pressure difference between the two pressure detectors exceeds a preset value, a filter replacement operation is performed.

As a preferred embodiment, a weighing scale is provided at the bottom of the grinding liquid mixing tank.

As can be seen from the above description, a grinding liquid mixing and supplying system of the present invention mainly adds a stock solution circulation tank, so that the grinding liquid can be circulated and filtered prior to mixing, eliminating impurities or coarse particles that may be remained in the stock solution, and the grinding liquid is mixed by using the inclined maglev stirrer, so as to reduce the shear stress and avoid coagulation into coarse particles. In addition, the liquid in each tank cooperates with the connected capacitive liquid level sensor to monitor the liquid level and quality to ensure the liquid state at each stage. Thus, by utilizing the measurement and monitoring methods of the original grinding liquid supplying equipment, combined with the multiple safety and monitoring mechanisms added by the present invention, various adverse factors that may form coarse or large particles in the grinding liquid are effectively eliminates, so as to output high-quality grinding liquid having even and fine slurry particles.

DETAILED DESCRIPTION OF THE PREFERRED EMBODIMENT

The technical solution of the present invention will be clearly and completely described below in conjunction with specific embodiments and accompanying drawings. It should be noted that when an element is referred to as being "mounted or fixed on" another element, it means that it may be directly on another element or there may be an intervening element. When an element is said to be "connected" to another element, it means that it may be directly connected to the other element or intervening elements may also be present. In the illustrated embodiment, the directions of up, down, left, right, front and rear, etc., are all relative, to explain that the structure and movement of the different components of the present invention are relative. These representations are pertinent when the components are in the positions shown in the figures. However, if the description of the location of elements changes, these representations are considered to change accordingly.

Unless defined otherwise, all technical and scientific terms used herein have the same meaning as commonly understood by those skilled in the technical field of the present invention. The terminology used herein is for the purpose of describing particular embodiments only and is not intended to limit the present invention. As used herein, the term "and/or" includes any and all combinations of one or more of the associated listed items.

Figure 1:
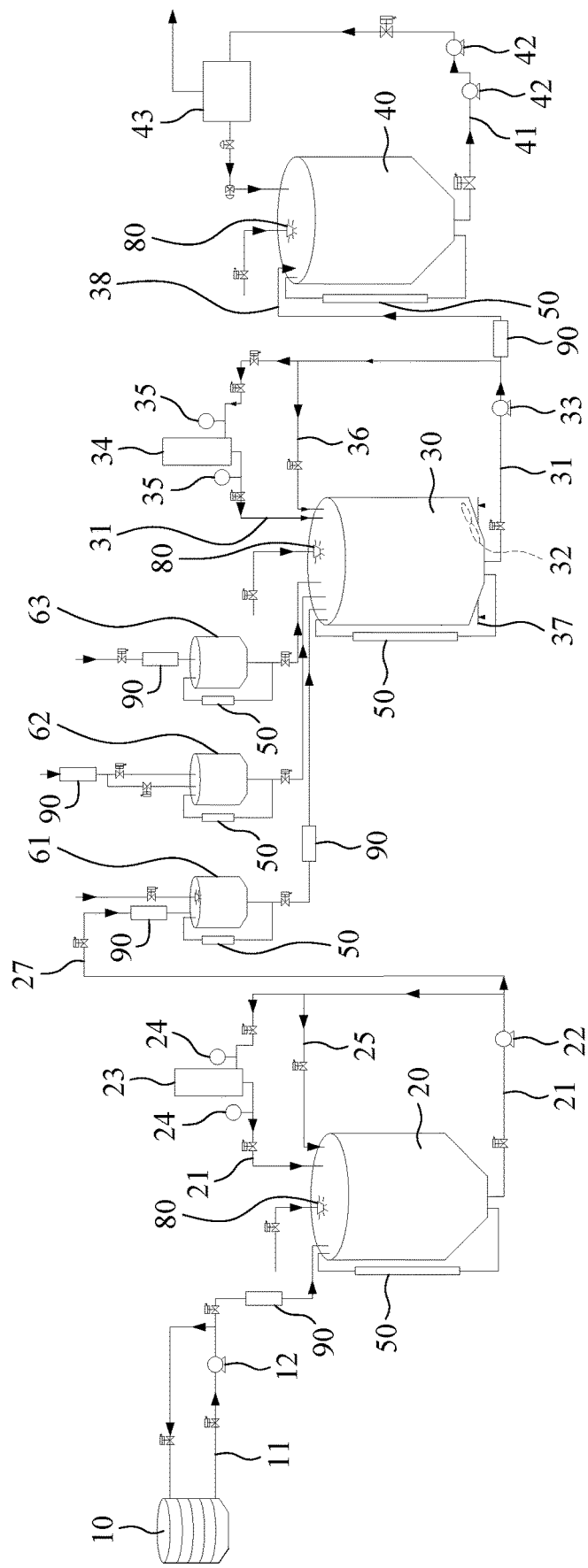
FIG. 1 is a structure diagram of a grinding liquid mixing and supplying system of the present invention.

As shown in FIG. 1, it is a structure diagram of a grinding liquid mixing and supplying system of the present invention. The grinding mixing and supplying system of the present invention comprises a stock solution barrel 10, a stock solution circulation tank 20, a grinding liquid mixing tank 30, and a grinding liquid supplying tank 40, which are connected through pipelines. Wherein, the stock solution circulation tank 20, the grinding liquid mixing tank 30, and the grinding liquid supplying tank 40 are each connected in parallel with a capacitive liquid level sensor 50. After the concentrated stock solution is outputted from the stock solution barrel 10, it is sequentially circulated and filtered, mixed and prepared into a grinding liquid, and finally stored for later use. During the process, the capacitive liquid level sensor 50 also simultaneously monitors whether the liquid in each tank is normal, thereby maintaining the high-quality output of uniform and fine slurry particles in the grinding liquid.

Hereinafter, the structure of each component is described in detail:

The stock solution barrel 10 is the concentrated grinding liquid stock solution barrel sent by the manufacturer. The stock solution barrel 10 is provided with a stock solution pipeline 11 to output the stock solution. The stock solution pipeline 11 is provided with a booster pump 12 to facilitate the transport of the stock solution to the stock solution circulation tank 20. Further, excess liquid can also flow back to the stock solution barrel 10.

The stock solution circulation tank 20 is mainly used to circulate and filter the stock solution to remove impurities or coarse particles that may be remained in the barrel. The stock solution circulation tank 20 is provided with a first pipeline 21, the first pipeline 21 is provided with a first pump 22 and a first filter 23, and the first pipeline 21 allows the stock solution to flow out from the bottom of the stock solution circulation tank 20. After being pressurized by the first pump 22, the stock solution is sent to the first filter 23, and after being filtered by the first filter 23, the stock solution is returned to the stock solution circulation tank 20. Since the concentrated stock solution supplied by the manufacturer usually has less impurities, the present invention adds the stock solution circulation tank 20 to filter the stock solution, which can effectively and surely remove all remaining impurities, so as to avoid the possibility of residual impurities or coarse particles condensing into large particles or combining into many coarse particles, which will easily cause scratches in the subsequent grinding process and affect the grinding quality. The purpose of the stock solution circulation tank 20 added in the present invention is to eliminate the adverse factors that may produce coarse particles in the early stage. In addition, pressure detectors 24 are respectively provided at the inlet and outlet pipeline positions of the first filter 23, and a first return pipeline 25 is connected in parallel. When the liquid pressure difference between the two pressure detectors 24 exceeds a preset value, this represents that the filter element in the first filter 23 may be blocked, thus, the machine can be shut down or switched to the first return pipeline 25 for the replacement of the filter element or inspection. In addition, the capacitive liquid level sensor 50 connected in parallel in the present invention can detect the liquid level of the liquid in the stock solution circulation tank 20 and monitor whether the liquid is normal, thereby ensuring the quality and quantity of liquid injected each time, which is an additional security mechanism. The detailed operation of the capacitive liquid level sensor 50 will be described in detail later.

The grinding liquid mixing tank 30 is mainly used to mix the grinding liquid, which receives the stock solution delivered by the first branch pipeline 27 of the first pipeline 21, in conjunction with other liquid supplying pipelines supplying different liquids, mixing is performed and a grinding liquid is prepared and then outputted. In this embodiment, the grinding liquid mixing tank 30 is connected with a grinding liquid measuring tank 61, a deionized water measuring tank 62, and a chemical product measuring tank 63, and the stock solution sent by the first pipeline 21 is firstly poured into the grinding liquid measuring tank 61 for metering, and then outputted to the grinding liquid mixing tank 30. The deionized water measuring tank 62 is connected with a deionized water supplying pipeline to supply deionized water. The chemical product measuring tank 63 is connected with a chemical product supplying pipeline to supply the chemical product liquid. In this embodiment, the chemical product liquid is hydrogen peroxide ($H_2O_2$), but the present invention is not limited to this, and different chemicals can be selected according to different formulations. In addition, the grinding liquid measuring tank 61, the deionized water measuring tank 62, and the chemical product measuring tank 63 all have a quantitative supplying mechanism or mechanics, such as a flow meter 90 or a quantitative supplying structure, to provide accurate liquid output. The relative mechanisms can be chosen according to different manufacturers. The special feature of the present invention is that the capacitive liquid level sensor 50 can be connected in parallel with the grinding liquid measuring tank 61, the deionized water measuring tank 62, and the chemical product measuring tank 63. Thereby, the liquid level and quality monitoring of the capacitive liquid level sensor 50 are used in addition to and in conjunction with the original metering mechanism of the tank body, so as to achieve multiple safety metering monitoring mechanisms. Thus, when the quality of the liquid is different or the wrong liquid is added, the inspection can be stopped immediately, and the factors that went wrong can be eliminated at the source of the mixing operation.

The grinding liquid mixing tank 30 is provided with a second pipeline 31 and a maglev stirrer 32, the second pipeline 31 is provided with a second pump 33 and a second filter 34, the second pipeline 31 allows the grinding liquid to flow out from the bottom of the grinding liquid mixing tank 30, to be pressurized by the second pump 33 and to be sent to the second filter 34, and then to return to the grinding liquid mixing tank 30 after being filtered by the second filter 34. When the concentrated stock solution, deionized water, and chemicals are mixed to make the grinding liquid, sometimes they will condense to form large particles. The second filter 34 is used for circulating filtration to ensure that the particles of the grinding liquid are uniform and fine. In addition, in this embodiment, pressure detectors 35 are also provided at the inlet and outlet pipeline positions of the second filter 34, and a second return pipeline 36 is connected in parallel. When the liquid pressure difference between the two pressure detectors 35 exceeds the a preset value, this represents that the filter element in the second filter 34 may be blocked, thus, the machine can be shut down or switched to the second return line 36 for the replacement of the filter element or inspection. In addition, in this embodiment, the bottom of the grinding liquid mixing tank 30 is provided with a weighing scale 37, and the weighing scale 37 performs measuring on the amount of liquid outputted from each of the grinding liquid measuring tank 61, the deionized water measuring tank 62, and the chemical product measuring tank 63, so as to verify the amount of liquid and to achieve the purpose of double confirmation of the added amount. In addition, the grinding liquid mixing tank 30 is also connected in parallel with the capacitive liquid level sensor 50 to detect the liquid level and monitor whether the liquid is normal.

Figure 2:
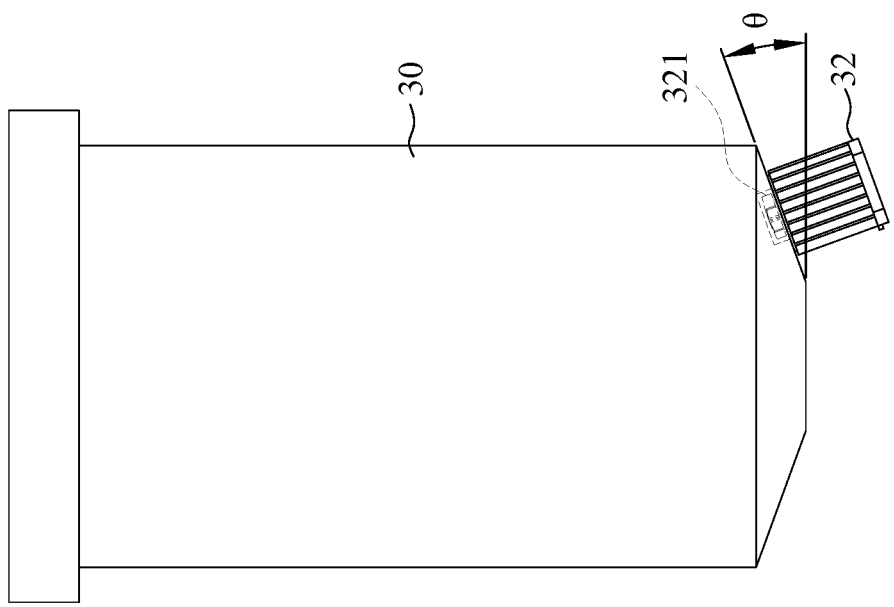
FIG. 2 is a structural diagram of a grinding liquid mixing tank of the grinding liquid mixing and supplying system of the present invention.

The mixing and preparation of the grinding liquid must be composed of various liquids, and a stirrer is used to generate vortex or disturbance at the bottom of the tank in order to mix evenly. However, the conventional stirrers are all arranged at the center of the bottom, and under the action of high pressure and high speed, it is easy to cause shear stress in the grinding liquid, so that the particles are combined with each other, and then the small particles are combined into coarse particles or large particles, and some even condense into lumps. In order to avoid this problem, the present invention has made some improvements. FIG. 2 is the side schematic view of the grinding liquid mixing tank of the present invention, in FIG. 2, the input, output or paralleled connected pipelines connected to the grinding liquid mixing tank 30 are not shown, and the emphasis of this figure is that a shaft-less maglev stirrer 32 is installed at the bottom of the grinding liquid mixing tank 30 at an inclination angle θ with respect to a horizontal line. A stirring blade 321 of the maglev stirrer 32 is openly arranged in the tank, and the inclination angle θ is between 15 to 25 degrees. In order to achieve the purpose of uniform mixing of the grinding liquid, this method can greatly reduce the generation of shear stress, thereby avoiding the situation where the particles combine with each other to produce coarse or large particles.

Figure 3:
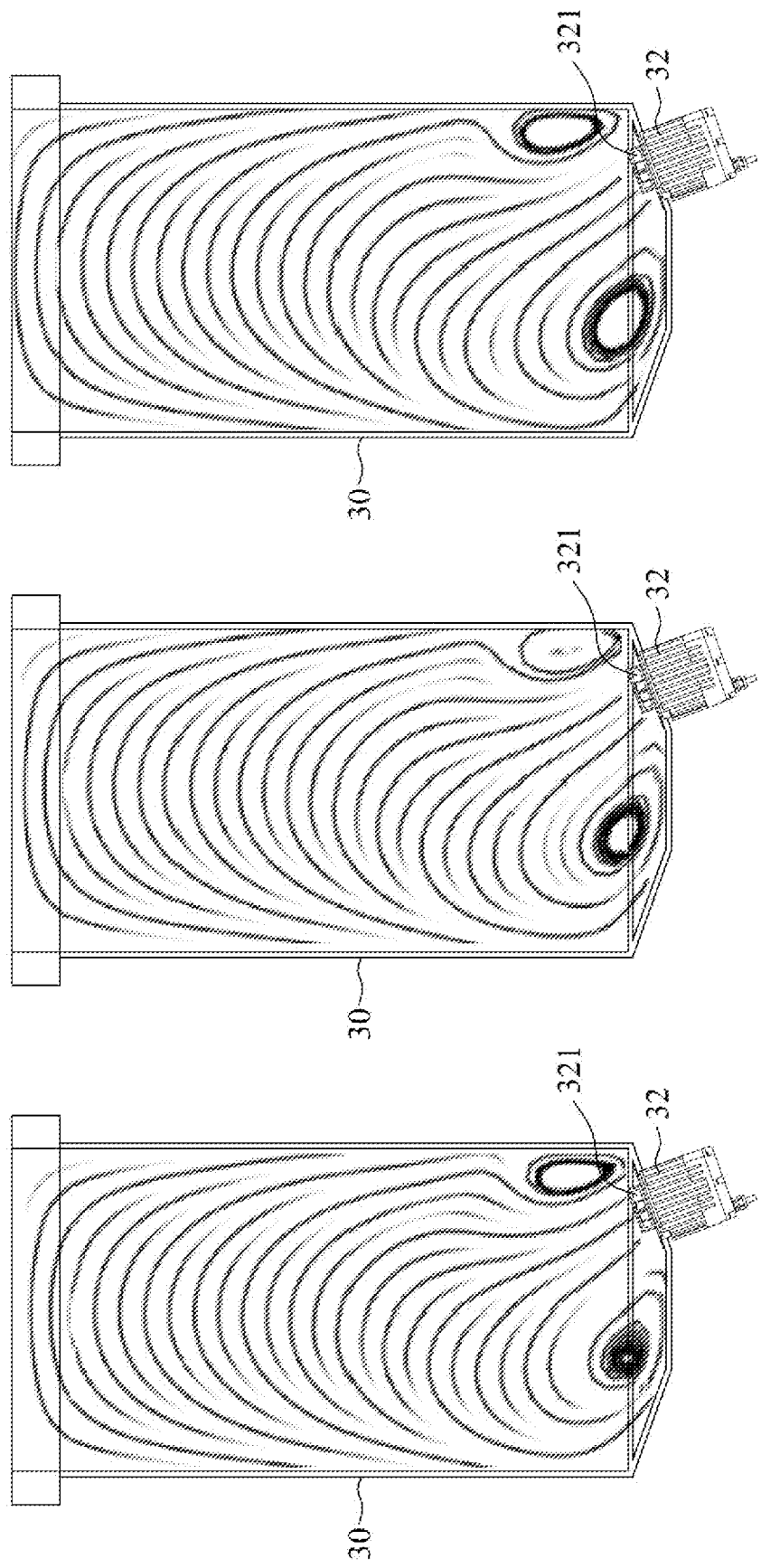
FIG. 3A is a plan view of the internal vortex state of the grinding liquid mixing tank of the present invention at a speed of 100 revolutions per minute (rpm)
FIG. 3B is a plan view of the internal vortex state of the grinding liquid mixing tank of the present invention at a speed of 500 rpm.
FIG. 3C is a plan view of the internal vortex state of the grinding liquid mixing tank of the present invention at a speed of 1000 rpm.

In order to show that the present invention can indeed achieve the uniform mixing effect, the present invention utilizes computational fluid dynamics (CFD) computer simulation software to carry out related simulations. In the simulation state, it is assumed that the tank is filled with water, the stirring blade 321 is set as a rotating area, different stirring speeds are set in the rotating area, and the wall boundary condition is set on the static wall of the rotating area. FIG. 3A is a vortex motion distribution diagram representing the rotating area near the stirring blade 321 when the rotating speed is set at 100 rpm. FIG. 3B is a vortex motion distribution diagram representing the rotating area near the stirring blade 321 when the rotation speed is set at 500 rpm. FIG. 3C is a vortex motion distribution diagram representing the rotating area near the stirring blade 321 when the rotation speed is set at 1000 rpm. It can be seen from the figures that under various rotational speeds, the entire area in the tank produces a uniform vortex effect, which can be proved by the evenly distributed and seemingly parallel liquid flow curves in the figures. Also, partial areas with thicker black lines only represents that the speed is fast at this particular area, and good eddy current mixing effect can still be achieved. Therefore, the inclination angle θ of the maglev stirrer 32 of the present invention set at the bottom of the grinding liquid mixing tank 30 is between 15 and 25 degrees, and the angle in the figures is 18 to 22 degrees, so that the purpose of uniform mixing of the grinding liquid can be achieved, and the shear stress in the mixing process can be effectively reduced.

The grinding liquid supplying tank 40 mainly collects the prepared grinding liquid, and then waits to send the prepared grinding liquid to each grinding machine. The grinding liquid supplying tank 40 receives the grinding liquid transported by the second branch pipeline 38 of the second pipeline 31, and is provided with an output pipeline 41, which is provided with at least one output pump 42 and a diverting valve box 43, the output pipeline 41 allows the grinding liquid to flow out from the bottom of the grinding liquid supplying tank 40, the grinding liquid is then pressurized by the output pump 42 and transferred to the diverting valve box 43, and then diverted to the corresponding grinding machine through the diverting valve box 43. In addition, the grinding liquid supplying tank 40 is also connected in parallel with the capacitive liquid level sensor 50.

The capacitive liquid level sensor 50 of the present invention is used to detect the liquid level in the tank connected in parallel with it and monitor whether the liquid is normal. Through calculation and verification of the capacitance, it can be judged whether the liquid is the preset substance, that is, whether the liquid is normal. If it is different, it will immediately send a signal to stop and check, and then calculate the liquid level consequently. The tank body described in the following paragraphs can be one or all of the stock solution circulation tank 20, the grinding liquid mixing tank 30, the grinding liquid supplying tank 40, the grinding liquid measuring tank 61, the deionized water measuring tank 62, and the chemical product measuring tanks 63. Although the size of the capacitive liquid level sensor 50 is slightly different with the different sizes of different tanks, but the operating principle is the same. Next, the capacitive liquid level sensor 50 of the present invention will be described.

Figure 4:
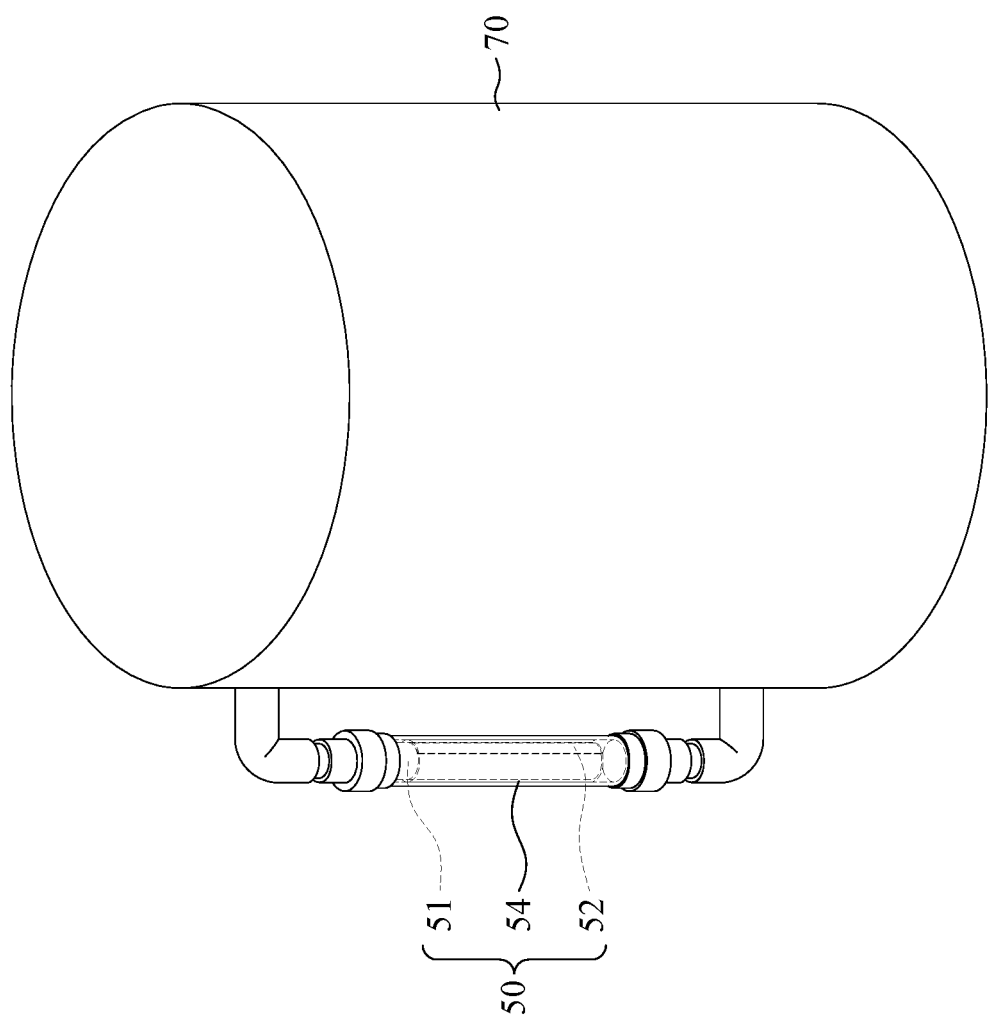
FIG. 4 is a structural perspective and installation diagram of a capacitive liquid level sensor of the grinding liquid mixing and supplying system of the present invention.
Figure 5:
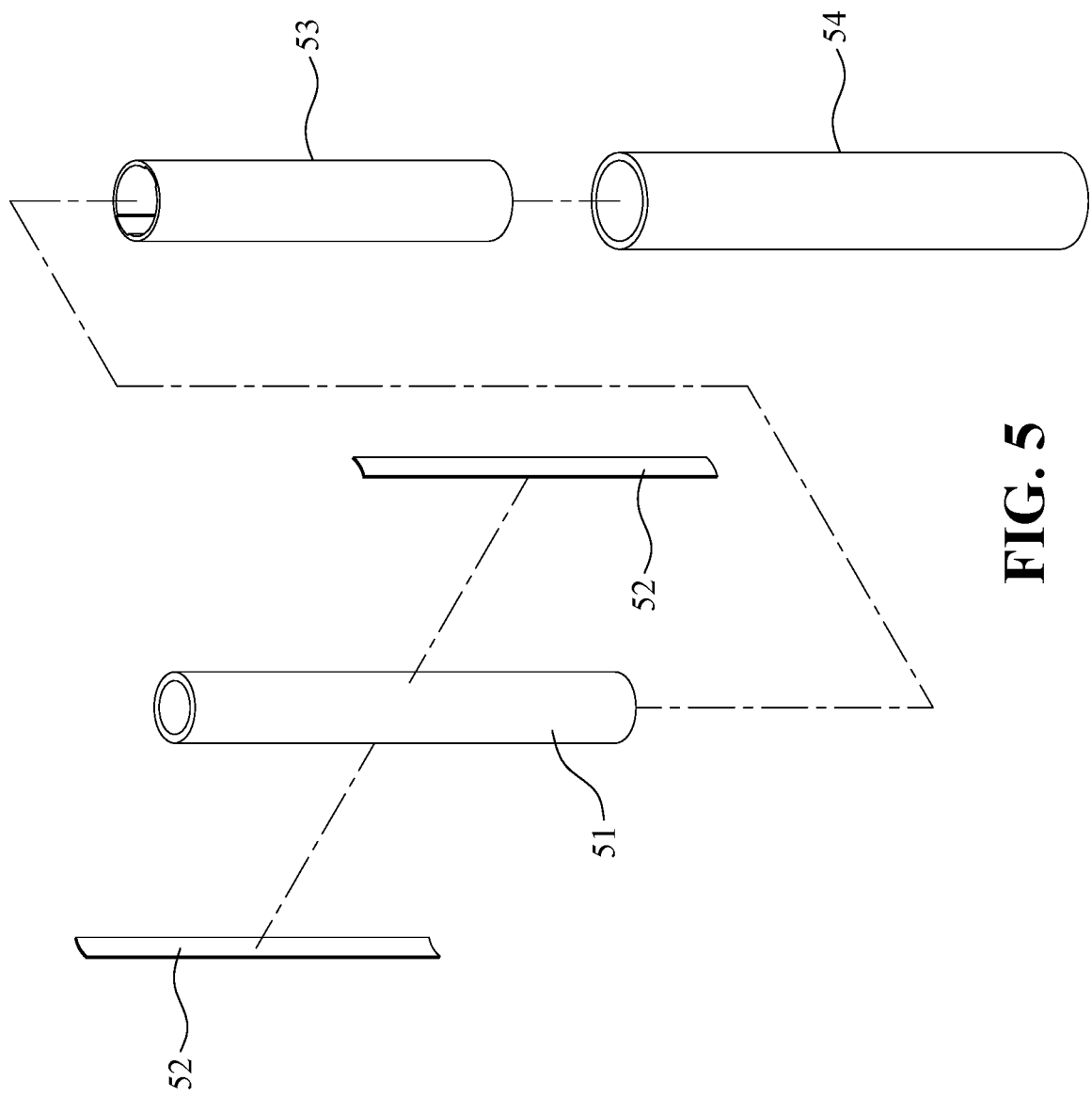
FIG. 5 is an exploded schematic view of the capacitive liquid level sensor of the grinding liquid mixing and supplying system of the present invention.
Figure 6:
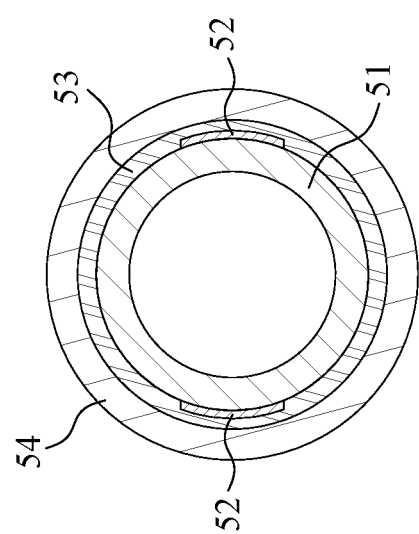
FIG. 6 is an enlarged schematic diagram of a transverse cross-section of the capacitive liquid level sensor of the grinding liquid mixing and supplying system of the present invention.

As shown in FIG. 4, FIG. 5 and FIG. 6, the capacitive liquid level sensor 50 of the present invention includes a tube body 51, two conductive sheets 52, a clip 53, and a bundle tube 54. The tube body 51 is vertically connected in parallel with a tank body 70 communicating with it, so that the liquid level in the tube body 51 is the same as the liquid level in the tank body 70. The tank body 70 in the figure is only a simple schematic representation, and in actuality, the tank body would correspond to the above-mentioned different tanks bodies. The tube body 51 is a general transparent water tube made of plastic tube. Two conductive sheets 52 are arranged on the outer wall of the tube body 51 in a manner that is parallel to the tube center line. In this embodiment, the conductive sheets 52 are copper sheets. The clip 53 is used to fix the conductive sheets 52 to the outer wall of the tube body 51, and in this embodiment, the clip 53 is a hose made of rubber. The bundle tube 54 is a metal tube, which is sleeved on the periphery of the tube body 51 and the clip 53. In this embodiment, the bundle tube 54 is a stainless steel tube for electromagnetic interference shielding.

Figure 7:
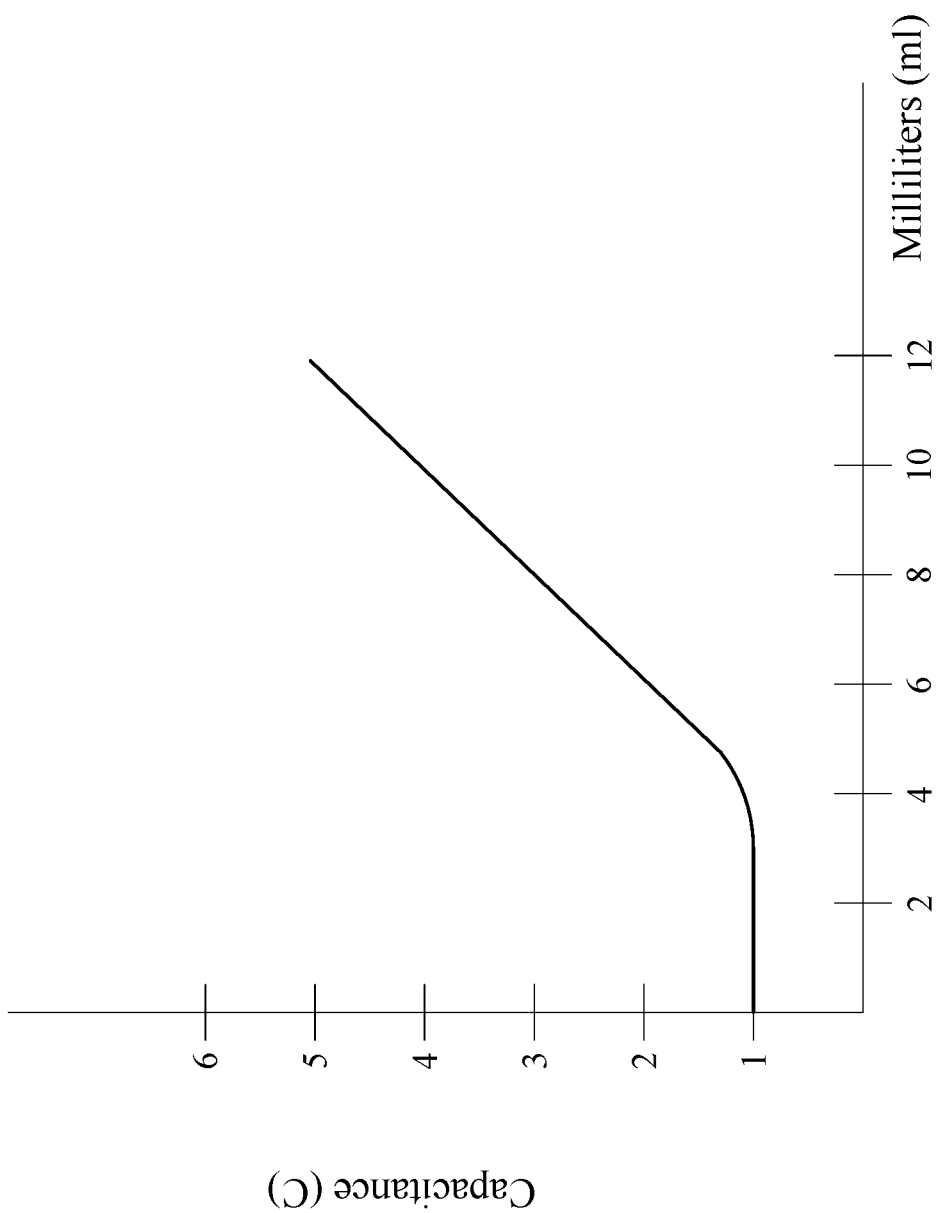
FIG. 7 is a table showing the relationship between the volume and the capacitance of deionized water.

The capacitive liquid level sensor 50 of the present invention has two functions: one is to detect the liquid level of the tank body 70 connected in parallel with it, and the other is to monitor whether the liquid in the tank is normal. The explanation of how it works is as follows:

Firstly, the present invention must first make a relationship table between the volume and the capacitance of standard liquids for different liquids, according to the capacitance formula $C=Q/V$, C is the capacitance, Q is the charge amount, and V is the voltage, so in the condition where voltage is fixed, the capacitance increases as the injected liquid increases. The method of making the relationship table between volume and capacitance is: use the tank body 70 containing the predetermined liquid and its paralleled connected capacitive liquid level sensor 50. Use the standard liquid to accurately calculate the liquid injected into the tank body 70 with a flow meter, the liquid flowing into the tank body 70 will also flow into the tube body 51 connected in parallel. Connect wires to the two conductive sheets 52, give a voltage of Vac=1V, set the frequency to 2 MHz, and then use the flow meter to gradually calculate the amount of liquid added. For example, when 10 liters/20 liters/30 liters are injected into the tank body 70, the liquid volume in the tube body 51 will also be from 1 to 12 milliliter (ml). During this process, the change of the capacitance C is recorded synchronously. Thus, the relationship table between the volume and the capacitance is derived. In addition, the conversion formula between the volume of the standard liquid and the capacitance can also be calculated according to this relationship table. FIG. 7 shows the relationship table between the volume and the capacitance of deionized water. This simple mathematical conversion formula can also be obtained as 1 ml=1.6459*capacitance (C). Of course, due to the different dielectric constant of different liquids, the relationship between the volume and the capacitance is also different, and the formula is also different.

The capacitive liquid level sensor 50 is based on the relationship table between the volume and the capacitance of standard liquids, and in conjunction with the measured capacitance obtained during the injection of liquid in the actual operation, the liquid monitoring and liquid level determining is performed. Since FIG. 7 is the relationship table between the volume and the capacitance of deionized water, the operation method of the capacitive liquid level sensor 50 connected in parallel with the deionized water measuring tank 62 will be described below. After the deionized water is injected into the deionized water measuring tank 62, because the capacitive liquid level sensor 50 is connected in parallel with the deionized water measuring tank 62, a corresponding water level is also formed in the tube body 51. At this time, by using wires connected to the two conductive plates 52 and by applying a voltage of a predetermined frequency, the capacitance is obtained, and then use the conversion formula obtained from the "measured capacitance" and the "relationship table between volume and capacitance" to perform the following operations:

In this embodiment, the deionized water measuring tank 62 is connected to a flow meter 90 to accurately calculate the injected supplied liquid volume. Therefore, after obtaining the above-mentioned "measured capacitance", the conversion formula obtained from the "relationship between volume and capacitance", such as 1 ml=1.6459*capacitance (C), the liquid volume in milliliters inside the tube body 51 is calculated by computer software, and based on the results, the calculated liquid volume injected into the tank body 70 is calculated. Further, compare the calculated liquid volume with the supplied liquid volume obtained by the flowmeter 90, if the two are the same, it would represent that the liquid is normal, and if the two are not the same, it would represent that the liquid is abnormal. That is, the injected liquid is not the preset liquid. The system will immediately generate an alarm, and the operator can immediately stop the machine for inspection. Of course, if the liquid volume comparison results are that two are the same, the liquid level can also be provided accordingly, so that the capacitive liquid level sensor 50 of the present invention can provides the functions of detecting the liquid level of the liquid in the tank body 70 and monitoring whether the liquid is normal.

Since the capacitive liquid level sensor 50 of the present invention will be installed in each tank body 70, it is necessary to produce the corresponding relationship tables for volume and capacitance through experiments for the stock solution, grinding liquid, deionized water, chemicals, etc. In addition, a flow meter 90 can also be installed in the pipelines prior to each tank to obtain the inflowing liquid volume.

In addition, the present invention can also be provided with a wet nitrogen system 80 or a pressure detector at the stock solution circulation tank 20, the grinding liquid mixing tank 30, and the grinding liquid supplying tank 40. The wet nitrogen system 80 is in a sealed tank body, and the wet nitrogen is periodically injected into the tank, so that a sealed or stagnant wet nitrogen can be generated in the space above the grinding liquid, so as to avoid the drying of the grinding liquid in the tank and form particle agglomeration, which will affect the grinding quality. In addition, the pipes connected to the stock solution circulation tank 20, the grinding liquid mixing tank 30, the grinding liquid supplying tank 40, the grinding liquid measuring tank 61, the deionized water measuring tank 62, and the chemical product measuring tank 63 can also be equipped with a specific gravity (SG) and PH measuring equipment to carry out quality inspection on the liquid in each tank. This is prior art and will not be described in detail.

Based on the above description, the grinding liquid mixing and supplying system of the present invention utilizes the stock solution circulation tank to allow the grinding liquid to be circulated and filtered prior to mixing, to eliminate impurities or coarse particles that may be remained in the concentrated stock solution, and to remove the unfavorable factors that generate coarse particles at the source. Also, by using an inclined maglev stirrer to perform mixing on the grinding liquid, the shear stress is reduced and thus coagulation into coarse particles is reduced, so that the slurry of the final outputted grinding liquid is uniform and fine. Further, by using the connected capacitive liquid level sensor in each tank, the liquid level and quality of the liquid is monitored, to ensure the condition of the liquid at each stage. Once there is a problem, the machine is stopped immediately for inspection and the problem is solve, so that possible adverse factors during the mixing process of the grinding liquid can be completely eliminated, and then grinding liquid with excellent quality and condition can be outputted.

The above descriptions are only preferred embodiments of the present invention, and are not intended to limit the scope of the embodiments of the present invention. That is, all equivalent changes and modifications made according to the claims of the present invention are covered by the scope of the present invention.

What is claimed is:

1. A grinding liquid mixing and supplying system, comprising:
   a stock solution barrel outputting a stock solution from a stock solution pipeline;
   a stock solution circulation tank receiving the stock solution transferred by the stock solution pipeline, the stock solution circulation tank being provided with a first pipeline, the first pipeline being provided with a first filter and a first pump, and the first pipeline allowing the stock solution to flow out from the stock solution circulation tank, to be pressurized by the first pump, to be sent to the first filter, and to flow back to the stock solution circulation tank, so as to be circulated and filtered;
   a grinding liquid mixing tank receiving the stock solution transferred by the first pipeline and preparing a grinding liquid, the grinding liquid mixing tank being provided with a second pipeline and a maglev stirrer, the second pipeline being provided with a second filter and a second pump, the second pipeline allowing the grinding liquid to flow out from the grinding liquid mixing tank, to be pressurized by the second pump, to be sent to the second filter, and to flow back to the grinding liquid mixing tank, so as to be circulated and filtered, and the maglev stirrer being configured at a bottom of the grinding liquid mixing tank with an inclination angle of 15-25 degrees with respect to a horizontal line;

a grinding liquid supplying tank receiving the grinding liquid transferred by the second pipeline, the grinding liquid supplying tank being provided with an output pipeline, the output pipeline being provided with at least one output pump and a diverting valve box, the output pipeline allowing the grinding liquid to flow out from the grinding liquid supplying tank, to be pressurized by the output pump, to be sent to the diverting valve box, and to be output in a diverting manner; and a plurality of capacitive liquid level sensors, the stock solution circulation tank, the grinding liquid mixing tank, and the grinding liquid supplying tank being each connected in parallel with one capacitive liquid level sensor of the plurality of capacitive liquid level sensors, and the capacitive liquid level sensor detecting a liquid level of a liquid in the respective connected tank and monitoring whether the liquid level is normal in the connected tank.

2. The grinding liquid mixing and supplying system according to claim 1, wherein the capacitive liquid level sensor includes a tube body, two conductive sheets, a clip, and a bundle tube, the tube body is vertically connected in parallel with the tank that it is connected to so that a liquid level in the tube body is the same as the liquid level in the connected tank, and the two conductive sheets are arranged on an outer wall of the tube body in a manner that is fitting parallel to a center line of the tube body, the clip fixes the conductive sheets onto the outer wall of the tube body, the bundle tube is a metal tube and is sleeved onto an exterior of the tube body and the clip, and after the conductive sheets are conducted with electricity, a corresponding measured capacitance is generated based on a height difference of the liquid level in the tube body.

3. The grinding liquid mixing and supplying system according to claim 2, wherein a relationship table between a volume and a capacitance of the grinding liquid is prepared in advance for the capacitive liquid level sensor, and based on a conversion formula obtained from the relationship table between the volume and the capacitance of the liquid in the connected tank, an injected liquid volume is calculated through computer software according to the corresponding measured capacitance.

4. The grinding liquid mixing and supplying system according to claim 3, wherein the stock solution pipeline supplying the stock solution to the stock solution circulation tank, the first pipeline supplying the stock solution to the grinding liquid mixing tank and the second pipeline supplying the grinding liquid to the grinding liquid supplying tank each have a flow meter configured to obtain a supplied liquid volume injected into the respective tank, and the calculated injected liquid volume of the respective tank is compared with the supplied liquid volume, if the two liquid volumes are the same, it means that the liquid volume in the respective tank is normal, if not, it means that the liquid volume in the respective tank is not normal, and an abnormal state is reported.

5. The grinding liquid mixing and supplying system according to claim 1, wherein the grinding liquid mixing tank is also connected to a grinding liquid measuring tank, a deionized water measuring tank, and a chemical product measuring tank, so as to prepare the grinding liquid, the first pipeline is connected to the grinding liquid measuring tank; and the grinding liquid measuring tank, the deionized water measuring tank, and the chemical product measuring tank are each connected in parallel with one of the plurality of capacitive liquid level sensors.

6. The grinding liquid mixing and supplying system according to claim 5, wherein the respective capacitive liquid level sensor connected to each of the grinding liquid measuring tank, the deionized water measuring tank, and the chemical product measuring tank includes a tube body, two conductive sheets, a clip, and a bundle tube, the tube body is vertically connected in parallel with the tank that it is connected to so that a liquid level in the tube body is the same as the liquid level in the connected tank, and the two conductive sheets are arranged on an outer wall of the tube body in a manner that is fitting parallel to a center line of the tube body, the clip fixes the conductive sheets onto the outer wall of the tube body, the bundle tube is a metal tube and is sleeved onto an exterior of the tube body and the clip, and after the conductive sheets are conducted with electricity, a corresponding measured capacitance is generated based on a height difference of the liquid level in the tube body.

7. The grinding liquid mixing and supplying system according to claim 6, wherein a relationship table between a volume and a capacitance of the liquid is prepared in advance for the respective capacitive liquid level sensor, and based on a conversion formula obtained from the relationship table between the volume and the capacitance of the liquid in the connected tank, an injected liquid volume is calculated through computer software according to the corresponding measured capacitance.

8. The grinding liquid mixing and supplying system according to claim 6, wherein the first pipeline supplying the stock solution to the grinding liquid measuring tank, a deionized water supplying pipeline supplying deionized water to the deionized water measuring tank and a chemical product supplying pipeline supplying a chemical product to the chemical product measuring tank each have a flow meter to obtain a supplied liquid volume injected into the respective tank, and the calculated injected liquid volume of the respective tank is compared with the supplied liquid volume, if the two liquid volumes are the same, it means that the liquid volume in the respective tank is normal, if not, it means that the liquid volume in the respective tank is not normal, and an abnormal state is reported.

9. The grinding liquid mixing and supplying system according to claim 1, wherein two pressure detectors are respectively configured at inlet and outlet pipeline positions of the first filter, and when a pressure difference between the two pressure detectors exceeds a preset value, a filter replacement operation of the first filter is performed.

10. The grinding liquid mixing and supplying system according to claim 1, wherein two pressure detectors are respectively configured at inlet and outlet pipeline positions of the second filter, and when a pressure difference between the two pressure detectors exceeds a preset value, a filter replacement operation of the second filter is performed.

11. The grinding liquid mixing and supplying system according to claim 1, wherein a weighing scale is provided at the bottom of the grinding liquid mixing tank.

* * * * *